United States Patent

[11] 3,577,608

| [72] | Inventor | Jean Pierre Texier<br>Neuilly sur Seine, France |
|---|---|---|
| [21] | Appl. No. | 784,026 |
| [22] | Filed | Dec. 16, 1968 |
| [45] | Patented | May 4, 1971 |
| [73] | Assignee | Societe Gobin Daude (Societe Anonyme)<br>Paris, France |
| [32] | Priority | Dec. 14, 1967 |
| [33] | | France |
| [31] | | 132,317 |

[54] SEPARABLE FASTENER ELEMENTS
2 Claims, 14 Drawing Figs.

[52] U.S. Cl. ............................................................. 24/221
[51] Int. Cl. ................................................... A44b 17/00
[50] Field of Search ........................................... 24/221,
221.2, 221 (K), 221 (L), 208.3, 230 (TC)

[56] References Cited
UNITED STATES PATENTS

| 1,259,413 | 3/1918 | Kirschbaum | 24/221 |
| 1,723,972 | 8/1929 | Johnson | 24/221 |
| 3,220,078 | 11/1965 | Preziosi | 24/221 |
| 3,344,488 | 10/1967 | Texier | 24/221 |
| 3,405,431 | 10/1968 | Polon | 24/221 |

FOREIGN PATENTS

| 611,760 | 10/1960 | Italy | 24/221 |
| 1,129,470 | 1/1957 | France | 24/221 |

*Primary Examiner*—Stanley N. Gilreath
*Assistant Examiner*—Werner H. Schroeder
*Attorney*—Edwin E. Greigg ABSTRACT: The device of this invention includes preformed plastic fastener elements, one of which includes a socket containing diametrically opposed rigid means disposed therewithin and the other including an operator which is assemblable into locking engagement with the rigid means, said operator including bendable bifurcated leg means including lock means for securing said operator relative to said socket to permit relative rotation between the socket and the operator in order to permit assembly of an eyelet over the perimeter of said socket.

PATENTED MAY 4 1971
3,577,608
SHEET 1 OF 2
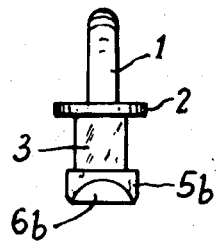
Fig.1
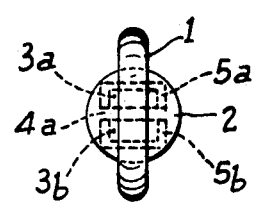
Fig.3
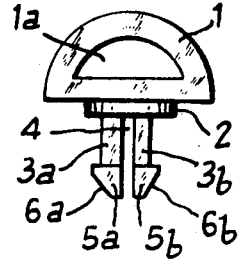
Fig.2
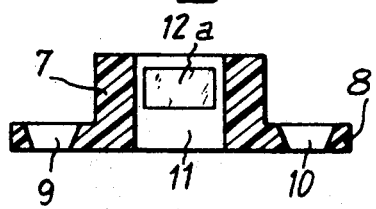
Fig.4
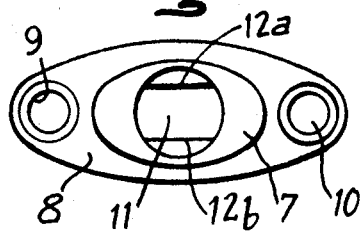
Fig.6
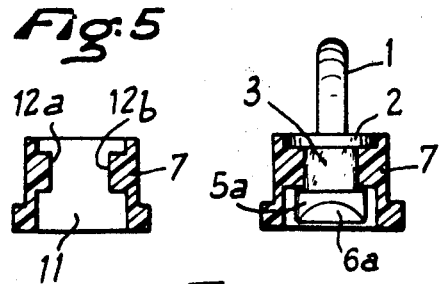
Fig.5  Fig.7
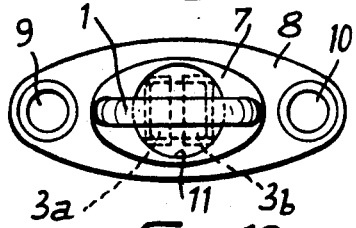
Fig.8
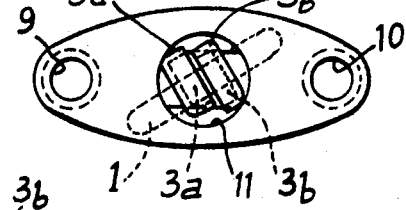
Fig.9  Fig.10
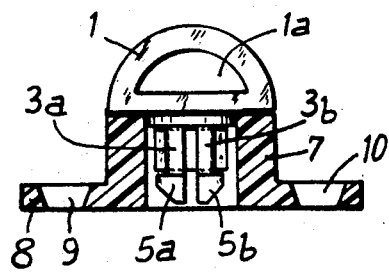
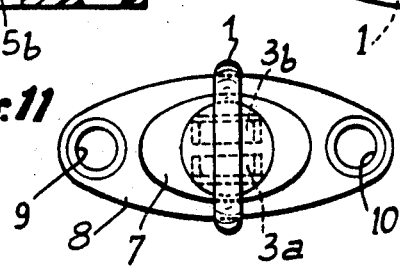
Fig.11
Inventor
Jean Pierre Texier

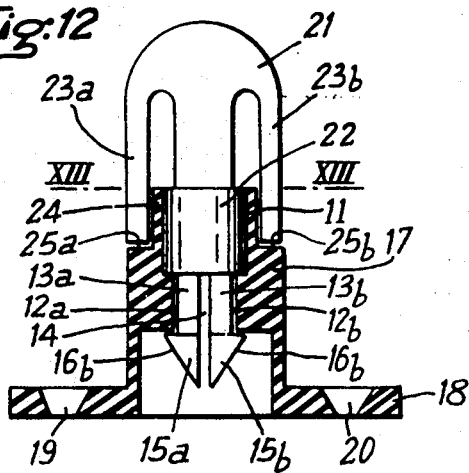
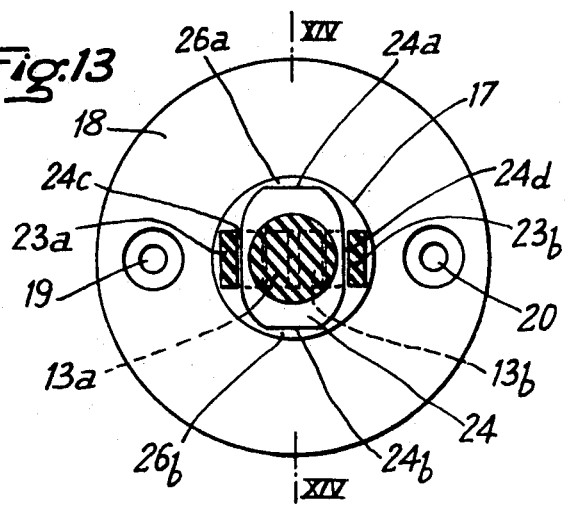
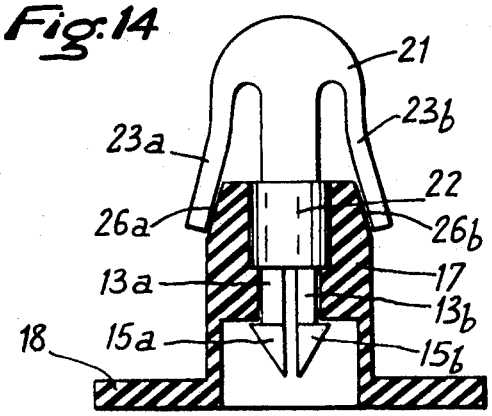

3,577,608

SEPARABLE FASTENER ELEMENTS

The invention relates to an improvement in fastener components which comprise head and socket members and, more particularly, to plastic fastener means of the type for fastening cloths, canvas, tarpaulin, or other covers in any desired position.

The present invention is a further improvement of my invention disclosed in U.S. Pat. No. 3,344,488, issued Oct. 3, 1967, and herein are disclosed several embodiments of a fastener element or clasp for cloths, canvas and the like, which comprises plastic socket members designed to receive an eyelet bordering an aperture disposed in the cloth to be fastened, and arranged to be received within an axial cylindrical housing in the socket member. The conjugated baring is a rotary head member provided with an operating means which, for the "free" position, allows the apertured cloth to be placed into position and in another position representing the "locked" position, which is achieved by rotation of the head to effectively resist withdrawal of the eyelet carried in the cloth. Further, the socket member comprises two symmetrical projections or ridge areas which are parallel to a diametrical plane and have on the upper and lower surfaces thereof two planes that are perpendicular to the axis and which have provided therebetween a free space to permit entry of bifurcated leg means which extend from the rotatable head member with the lower portion of said bifurcated legs including lock means and outwardly directed chamfered portions capable of causing the legs to be bent inwardly when the legs are inserted through said space between the rigid areas and further movement through said space brings the bifurcated legs, together with the lock means, into firm engagement beneath said rigid areas.

Thus, it will be seen that the lower portion of the legs which have a tapered cross section are separated by the diametrical slot and define two ramps or rails which facilitate the introduction of the head through the rigid projections provided in the socket member by virtue of the resultant flexibility thereof which allows the rotation of the legs between the two rigid projections with a view toward bringing it from one to the other of the two operating positions of the fastener element, as explained.

According to the first embodiment of the present invention, the socket member has an oval perimeter and the base of the operating or actuating head has a width substantially between the lengths of the major axis and the minor axis of the socket in such a manner that when the latter is positioned in the plane of the major axis, it protrudes inside the contour of the socket member and occupies the free position so that an eyelet may be removed, whereas in the position at 90° relative to its first position, it there occupies the locked position.

The provision, however, in cloths, canvas and the like of eyelets having an oval shape cannot be made with the aid of an automatic machine, which precludes any series manufacture thereof.

In accordance with a second embodiment of the present invention, which remedies this drawback, the socket member has a circular outer contour which is adapted to receive circular eyelets that may be applied with the aid of an automatic machine. The upper end of this type of socket member has a collar which is the shape of a cam having an essentially elliptical contour with the same planes of symmetry as the socket members, provided with four flat surface planes positioned at the end of the axes thereof whose major axis has a length very near the external diameter of the socket member, while the minor axis thereof has a length clearly smaller than the latter. This is best seen in FIG. 13. Further, the operating head is constructed of a material having an inherent elasticity and comprises two symmetrical arms with their lower ends arranged to contact the cam and having dimensions such that when they are positioned in the plane containing the minor axis, they are confined within the contour or perimeter of the socket member (FIG. 12) in the eyelet-engaging or removing free position, and so that when turned 90° they are cammed outwardly (FIG. 14) beyond the socket member and will lock or securely seat the eyelet.

Two embodiments of the present invention are illustrated by way of example in the accompanying drawings, wherein:

FIGS. 1, 2 and 3 illustrate the first embodiment of the fastener element according to the present invention in a side view, an elevational view and a top plan view, respectively;

FIGS. 4, 5 and 6 illustrate the socket member of the fastener element according to the present invention viewed in two diametrical cross sections at right angles to each other and in a top plan view, respectively;

FIGS. 7 and 8 are two diametrical cross-sectional views at right angles to each other of the socket member with the fastener element shown in elevation assembled therewith;

FIGS. 9 to 11 are top and bottom plan views showing the positions of the two halves of the fastener element, first in the position of introduction of the eyelet, second in the course of being rotated, and third in the locked position;

FIG. 12 is a view partially in elevation and partially in cross section illustrating a second embodiment of the present invention in the eyelet free position;

FIG. 13 is a cross-sectional view taken along line XIII—XIII of FIG. 12; and

FIG. 14 is a cross-sectional view in the locked position taken along line XIV—XIV of FIG. 13.

In the drawings, the same elements relative to the two embodiments according to the present invention have been identified with like reference numerals, changed respectively by 10 units.

In FIGS. 1—11, reference numeral 1 represents the operating or actuating head, provided at 1a with an aperture extending therethrough. Adjacent to the head there is a cylindrical platform or disc means 2, a square rod 3 comprising a longitudinal slot or notch 4 defining two bifurcated legs 3a, 3b which are identical with respect to each other and each comprising a projecting head 5a, 5b provided with an inclined surface 6a, 6b constituting a ramp or rail. The socket member has an oval exterior shape in the example shown and comprises cylindrical means defining an opening or housing 11 and is integral with a seat or base 8 provided with two fastening orifices 9, 10. Situated within the housing are two symmetrical projections 12a, 12b whose opposite surfaces are parallel to the axis and delimited on the upper and lower surfaces thereof by planes perpendicular to the axis shifted with respect to the corresponding extreme surfaces of the socket member. The spacing or distance of the surfaces with respect to the projections 12a, 12b corresponds essentially to the dimensions of the sidewalls of the bifurcated rod 3 and the height thereof is slightly less than the length of the latter.

The clasp or fastener element is assembled with the socket member by placing it into the axial opening in the housing in such a manner that upon an axial pressure being provided—due to the chamfer of the ramps or rails 6a, 6b—the bifurcated legs, due to elastic deformation thereof, are caused to approach each other and to be squeezed through the areas 12a–12. The bifurcated legs being thus compressed will then expand again (see FIG. 8) and the shoulder portions adjacent to heads 5a, 5b assure the locking or secure positioning of fastener element in the socket. The disc or plate 2 of the fastener is supported by the upper surface of the projections 12a, 12b, and the heads 5a, 5b are accommodated in the area between the lower surface of the projections and the bottom wall of the base member.

During the course of the introduction of the eyelet (not shown) over the socket member (FIG. 9) and then moving the head to the locking position (FIG. 11) which is carried out (see FIG. 10) by rotation of the operating or actuating head in a clockwise direction, the bifurcated legs 3a, 3b will be brought closer together and undergo a torsional stress, the effect of which is apparent from FIG. 10. Due to elastic expansion, the legs 3a, 3b will thereafter reassume the position shown in FIG. 11.

In the embodiment illustrated in FIGS. 12 to 14, the fastener element consists of a molded synthetic material comprising a head 21 that extends from a cylindrical bearing 22 and is provided with two spaced symmetrical arms 23a, 23b and is further rotatably mounted in the housing 11 of a socket 17, the latter having a circular configuration.

Disposed adjacent this cylindrical bearing 22 are two bifurcations 13b separated by a slotted or notched area 14 and accommodated therebetween, each bifurcation comprising a head 15a, 15b projecting beyond the outer extremity thereof and having a progressively tapering cross section toward the end thereof.

The socket 17 includes at the upper part thereof an integral extension 24 constituting camming means having an essentially elliptical contour and the same planes of symmetry as the socket member and provided with four flat surface planes 24a, 24b, 24c, 24d which are positioned at the ends of the two axes thereof, wherein the major axis has a length very close to the diameter of the socket member, whereas the minor axis has a length smaller than the latter.

As shown in FIGS. 12 and 13, the arms 23a and 23b are in an eyelet freeing position and being relaxed are positioned within the confines of a vertical plane extending above the outer configuration of the socket body as best shown in FIG. 13.

The extension or collar 24 which includes camming areas as previously described may have a cylindrical shape, but in this case, in the locked position shown in FIG. 14, the two arms 23a, 23b of the operating head, when the head is rotated into the position shown, will then rest upon the upper edges of the flat surface planes 26a and 26b.

I claim:

1. A fastener element including cooperative component members adapted to secure an eyelet member therebetween comprising in combination, a socket member including a base portion and having means defining an opening therein, parallel diametrically opposed rigid means within said socket member, a rotatable head member for assembly with said socket member and having an operator means therefor, depending bifurcated leg means on said operator including spaced lock means carried at the free end of each leg, said spaced lock means including outwardly directed chamfered portions below said lock means for bending the bifurcated leg means upon said leg means being inserted through said socket means and brought into locking engagement with said rigid means and thereby enabling subsequent relative rotation between the head and socket members to permit engagement of or removal therefrom of an eyelet member, an upstanding collar on said socket member of substantially elliptic form with flattened end surfaces forming cams parallel to a plane of symmetry of the socket member, and resilient means on said operator for engaging said cams.

2. A fastener element as claimed in claim 1, wherein a disclike centering member is integral with and interposed between the operator means and the bifurcated leg means carried thereby, said centering member being in operating engagement with the means defining the opening in said socket member.